United States Patent [19]

Fuentes

[11] Patent Number: 4,584,752

[45] Date of Patent: Apr. 29, 1986

[54] PAINT ROLLER COVER STRIPPER

[76] Inventor: Charles T. Fuentes, 5886 Leon Ave., Scotts, Mich. 49088

[21] Appl. No.: 667,576

[22] Filed: Nov. 2, 1984

[51] Int. Cl.[4] .............................................. B23P 19/04
[52] U.S. Cl. ......................................... 29/234; 29/270
[58] Field of Search ................. 29/227, 234, 235, 251, 29/252, 255, 257, 263, 270, 280

[56] References Cited

U.S. PATENT DOCUMENTS 1,365,559 1/1921 Starks .................................... 29/257
1,428,303 9/1922 Seeberg ................................. 29/251
4,516,303 5/1985 Klaster ............................... 254/10.5

*Primary Examiner*—Robert C. Watson
*Attorney, Agent, or Firm*—Gordon W. Hueschen

[57] ABSTRACT

The invention relates to a paint roller cover stripper for stripping off a paint holding cover from the spindle of a paint roller. There is provided a stripping head in the form of a frustoconical section of a hollow cone with the base portion having a diameter at least about that of the roller cover to be removed, and a top portion having a diameter such that it will pass over the spindle of the roller but not over the roller cover. In one form, the stripping head is pushed down onto the roller cover by a hand-operated lever arranged to give a mechanical advantage. The lever can be a link or toggle mechanism or a pawl and ratchet mechanism. In these forms of the invention, a handle-engaging cup is used to engage the laterally or normally extending portion of the handle of the roller so that the spindle is held against movement when the cover is being stripped therefrom. In a simpler modification, a stripping head is fastened to two draw bars or the like such that when the stripping head is on the spindle, a handle can be grasped and the stripping head pulled to remove the cover.

6 Claims, 7 Drawing Figures

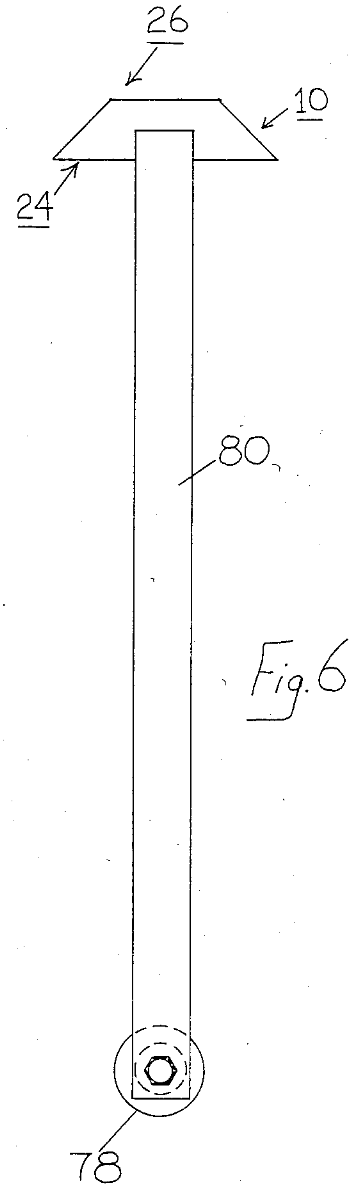
Fig. 6
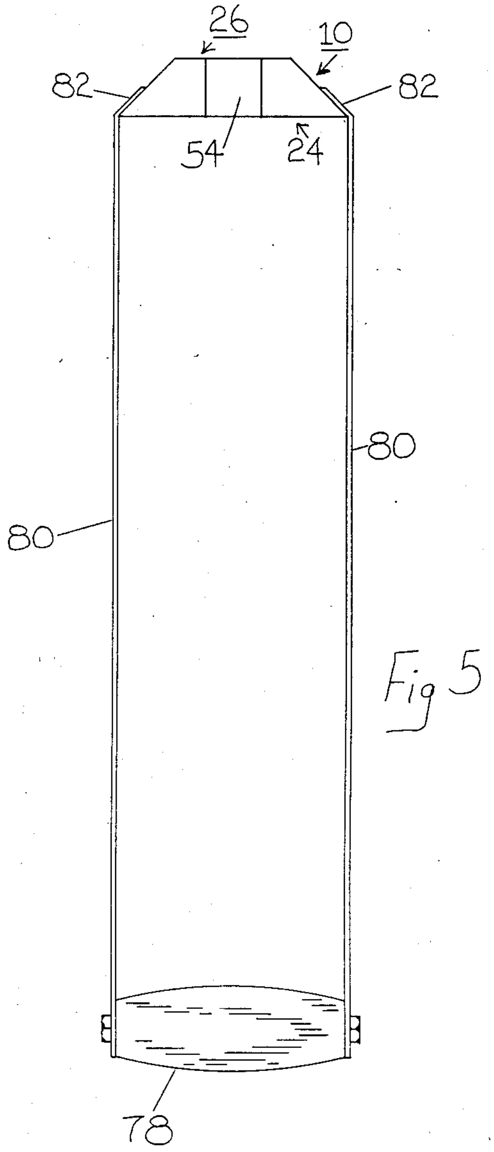
Fig 5
Fig. 7
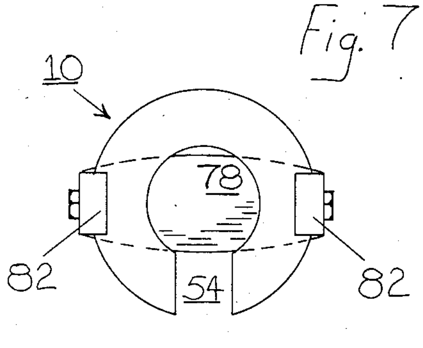

PAINT ROLLER COVER STRIPPER

BACKGROUND OF THE INVENTION

FIELD OF THE INVENTION AND PRIOR ART

The invention relates to a paint roller cover stripper and is particularly directed to a device for stripping off the paint holding cover from a spindle of a paint roller.

Paint is commonly applied by a roller which comprises a spindle adapted to rotate about an axis which has a normally-projecting handle member and which is covered by a removable paint holding cover. These covers are expendable and need to be replaced at intervals, e.g., when the cover no longer gives the proper paint texture, when a different color is used, or when it is time to clean up the cover.

Heretofore, there has been no satisfactory means for removing such covers, that is, for stripping them off of the spindle, and it is the purpose of this invention to provide such a means.

SUMMARY OF THE INVENTION

The invention relates to a paint roller cover stripper for stripping off the paint holding cover from the spindle of a paint roller which has a laterally-projecting handle comprising a stripping head having a central opening having a diameter such that it can slip over said spindle but not over said cover, and a radial slot which is wide enough to pass a handle member which projects laterally from said spindle, and force-transmitting means affixed to said stripping head whereby application of force thereto causes said stripping head to move down said spindle to strip the cover therefrom.

The invention more particularly relates to a paint roller cover stripper for stripping off the paint holding cover from the spindle of a paint roller which has a laterally-projecting handle comprising a frustoconical section of a hollow cone, the base of said section being circular and having a diameter as least as great as that of said cover and the top of said section being circular and having a diameter such that it can slip over said spindle but not over said cover, and said section having a radial slot opening which is wide enough to pass a handle member which projects laterally from said spindle, and force-transmitting means affixed to said section whereby application of force thereto causes said section to move down said spindle to strip the cover therefrom.

The invention may comprise one or more further features in which said force-transmitting means comprises rigid means affixed the top of said section and mounted to push said section down said spindle and which further comprises a base member and hand-operated means for applying pressure to said rigid means to cause it to move relative to said base member; in which said hand-operated means comprises a lever means operatively connected to said rigid means in a manner such that hand operation of said lever transmits the motion thereof to said rigid means; in which said hand lever is connected to said rigid member by link means; in which said hand lever is connected to said rigid member by pawl and ratchet means; in which said base member comprises holding means to hold said spindle against movement when said section is moved relative to said base member; and in which said holding means comprises engaging means for engaging a laterally-projecting handle member.

The invention also comprises a paint roller cover stripper for stripping off the paint holding cover from the spindle of a paint roller which has a laterally-projecting handle comprising a stripping head having a central opening having a diameter such that it can slip over said spindle but not over said cover, and a radial slot which is wide enough to pass a handle member which projects laterally from said spindle, and force-transmitting means affixed to said stripping head whereby application of force thereto causes said stripping head to move down said spindle to strip the cover therefrom, in which said force-transmitting means is longer than the cover to be removed, and terminates in the hand-engaging member, whereby said stripping means can be slipped over the laterally-projecting handle onto said spindle and into engagement with said cover and the cover removed by pulling said hand-engaging member while holding said spindle to effect relative movement between said section and said spindle whereby to effect stripping off of the roller cover.

Advantageously, the stripping head comprises a frustoconical section of a hollow cone, the base of which is circular and has a diameter as least as great as that of said cover and the top of which is circular and has a diameter such that it can slip over said spindle but not over said cover.

BRIEF DESCRIPTION OF THE DRAWINGS

In the drawings:

FIG. 5 is an elevation of another modified form;
FIG. 6 is a side view of FIG. 5;
and
FIG. 7 is a top view of FIG. 5.

DESCRIPTION OF THE PREFERRED EMBODIMENTS

Figures 1, 3:
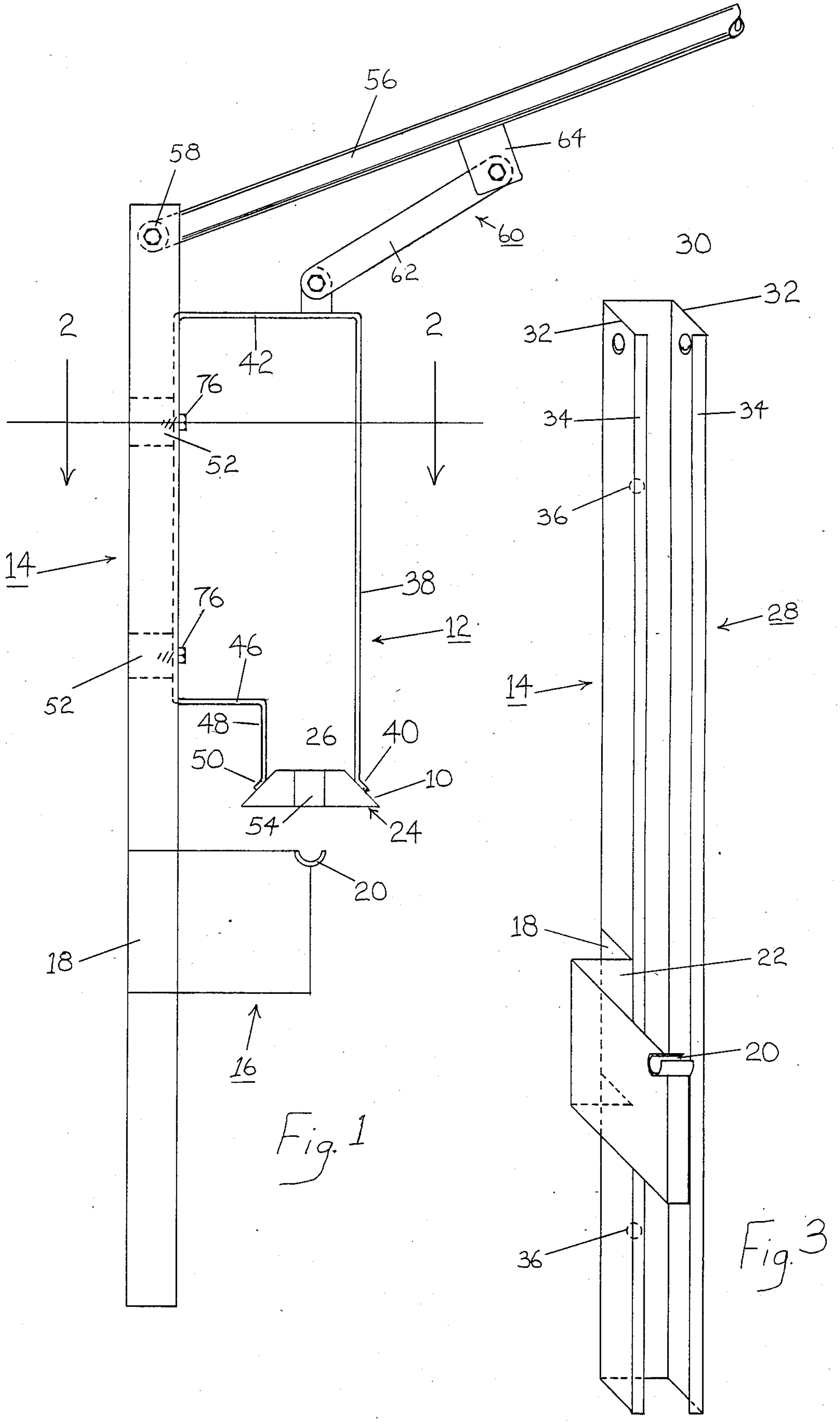
FIG. 1 is an elevation of one form of the invention.
FIG. 3 is an isometric view of a detail of FIG. 1.
Figure 2:
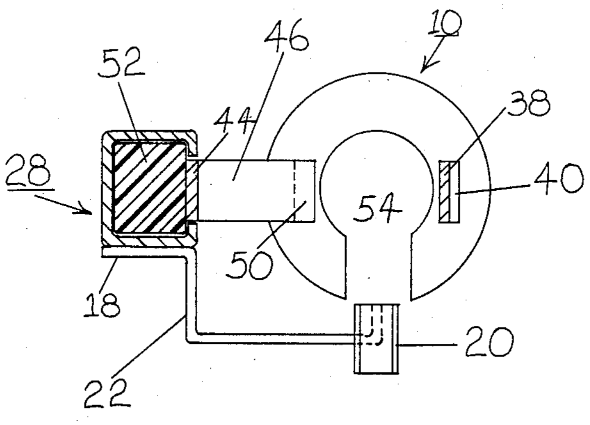
FIG. 2 is a cross section taken on line 2—2 of FIG. 1.

Referring now more particularly to FIGS. 1, 2, and 3, there is shown a modification of the invention in which the basic stripping head is a frustoconical section 10 of a hollow cone and is supported by rigid member 12 mounted for reciprocatory motion on a fixed base member 13. Below the conical section 10 is a support member 16 which is affixed to the fixed base 14, as shown at 18, and is provided with a handle-engaging member 20 adapted to received the portion of a roller handle which projects laterally or normally from the roller axis. The engaging member 20 is located by means of the offset 22 so that the conical section 10 can move by it when it is reciprocated and is disposed so that when a paint roller is hung thereon, with the laterally or normally-projecting portion of the handle in said engaging cup 20, the axes of the roller and the conical section 10 are in alignment. In such a case, when the conical section 10 is reciprocated downwardly, it engages the roller cover and pushes it off of the roller spindle. To this end, the base 24 of the conical section 10 has a diameter greater than the diameter of the roller cover and the top 26 of the conical section 10 has a diameter such that it will slip over the spindle of the roller but not over the roller cover.

The base member 14 comprises a channel member 28 having a base 30, sides 32, and inturned lips 34 mounted on a wall by suitable means such as the screw holes 36.

The rigid member 12 comprises an upright bar 38 affixed at 40 adjacent the top of the frustoconical section 10. The bar stock is bent to form a horizontal portion 42 which extends over to a vertical portion 44, then down to a horizontal portion 46 which terminates in a vertical portion 48 which, in turn, is fastened at 50 adjacent the top of section 10. The upright member 44 is fastened to slide blocks 52 which may be made of Teflon TM, nylon, or the like, adapted to slide up and down in the channel 28, thus providing for the reciprocation of the stripping head 10 with respect to the support or engaging cup 20.

The frustoconical section 10 has a radial slot, as shown at 54, so that it can be moved up and down, notwithdstanding that the laterally or normally-projecting portion of the handle is seated in the engaging cup 20.

Reciprocation of the rigid member 12 is effected by means of a lever 56 pivoted at 58 to the base member 14 and connected to the cross member 42 by linkage mechanism 60. By pressing down on the lever 60 motion is transmitted to the rigid member 12 to force the stripping head 10 down. By suitable adjustment of the length of the link 62 and the position of its pivot head 64, a mechanical advantage can be obtained which will facilitate the stripping of the cover from the spindle.

Figure 4:
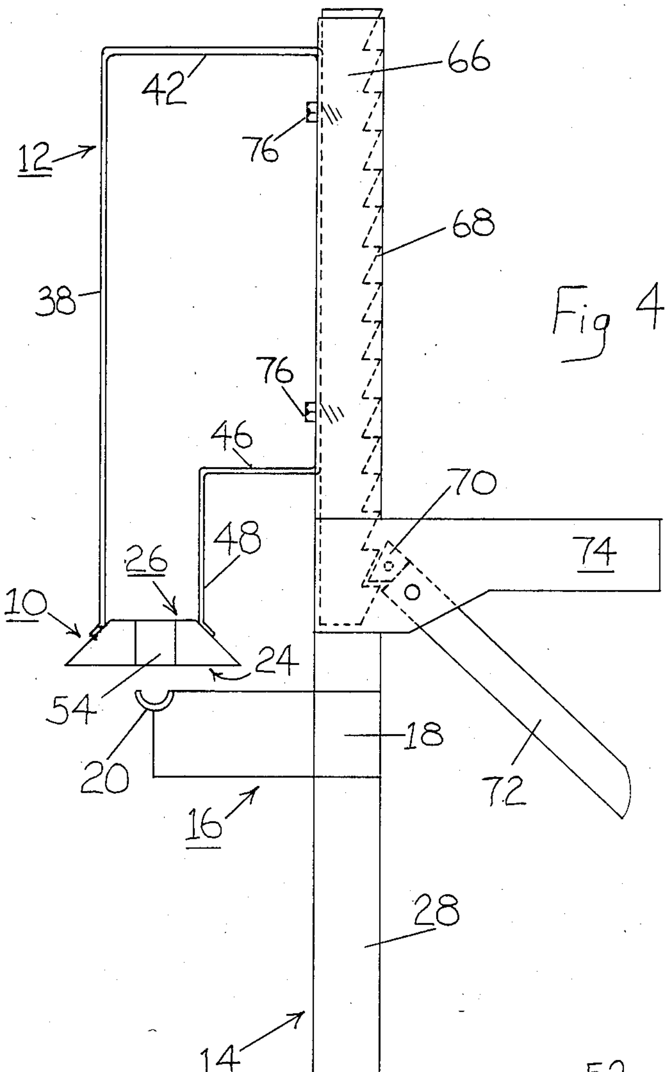
FIG. 4 is an elevation of a modified form.

The modification in FIG. 4 differs from that in FIG. 1 in that, instead of a lever and link hand-operated device for propelling the rigid member 12 up and down, a pawl and ratchet device of the same general construction as used in grease guns is shown diagrammatically in FIG. 4. Like parts are designated by like numbers.

Instead of the slide blocks 52, there is provided an elongate bar 66 having a saw-toothed edge 68 adapted to cooperate with a pawl 70, which is manipulated by a handle 72. Any suitable pawl and ratchet construction can be utilized here and that shown is intended to be diagramatic only. By squeezing the handle 72 against the fixed handle 74, the pawl 70 engages the teeth of the bar 66 and advances it toward a paint roller supported in the supporting or engaging cup 20. By reason of the great mechanical advantage which can be obtained by a pawl and ratchet construction, the device here illustrated is effective to remove covers from paint roller spindles even when they have been allowed to dry thereon and have thus become very difficult to remove.

The member 44 (not visible in FIG. 4) is fastened to bar 66 by suitable fasteners 76. The member 44 is shaped so that it fits into the channel 28 between the lips 34, as shown in FIG. 2. If desired, however, the sliding blocks 52 or bar 66 could have a raised portion extending up into the space between the lips 34, or could be moved out farther by use of suitable shims, not shown.

Both modifications shown in FIGS. 1, 2, and 3 and in FIG. 4, have mechanical means for moving the frustoconical section 10 up and down, or to and fro according to the orientation of the device, which mechanical means is such as to give a mechanical advantage which facilitiates removal of the cover, especially when it has become stuck on the spindle.

In the modification shown in FIGS. 5, 6, and 7, no such mechanical means is involved. Instead, the frustoconical section which is constructed exactly like the frustoconical section of the other modifications, is connected to a hand-engaging member or handle 78 by draw bars 80. The draw bars 80 are fastened at 82 adjacent to the base of the frustoconical section so that it can be drawn onto the paint roller rather than pushed onto it, as in the other modifications. The draw bars 80 are long enough to accommodate the roller and allow room enough for the handle 78 to be engaged. Thus, when the paint roller is held in one hand or in a vise or in any suitable device, and the stripper placed in position for the frustoconical section 10 to engage the roller cover, the handle 78 can be engaged to pull the cover off.

It is to be understood that the invention is not to be limited to the exact details of construction, operation, or exact materials or embodiments shown and described, as various modifications and equivalents will be apparent to one skilled in the art, and the invention is therefore to be limited only by the full scope of the appended claims.

I claim:

1. A paint roller cover stripper for stripping off the paint-holding cover from the spindle of a paint roller which has a laterally-projecting handle, comprising a hollow stripping head having, an inner surface in the shape of a frustoconical section of a cone the base and top of which section are formed by parallel planes substantially normal to the axis of the cone, the base of said hollow stripping head having an inside diameter larger than the outside diameter of said cover and the top of said hollow stripping head having an inside diameter such that it will slip over said spindle but not over said cover; a radial slot in said hollow stripping head which is wide enough to pass said handle which projects laterally from said spindle; and force-transmitting means affixed to said hollow stripping head; said hollow stripping head being adapted to be passed over said laterally-projecting handle by virtue of the radial slot therein to a position where the inner conical surface of said hollow stripping head rests against the end edge of said cover adjacent to said laterally-projecting handle with said roller head centered therein, whereby application of force to said hollow stripping head causes it to move axially down said spindle to strip said cover therefrom.

2. A paint roller cover stripper of claim 1, in which said force-transmitting means comprises rigid means which is mounted to push said stripping head down said spindle and which further comprises a hand-engaging member adapted to be grasped by the hand of a user, which hand-engaging member is rigidly affixed to said hollow stripping head so that the two move together as a unit and the force applied to said hand-engaging member is transmitted directly to said hollow stripping head without the intervention of force-transmitting means which is movable relative to said hollow stripping head or said hand-engaging member.

3. A paint roller cover stripper of claim 1, in which said force-transmitting means is longer than the cover to be removed, and terminates in the hand-engaging member, whereby said stripping head can be slipped over the normally-projecting handle onto said spindle and into engagement with said cover and the cover removed by pulling said hand-engaging member while holding said spindle to effect relative movement between said stripping head and said spindle whereby to effect stripping off the roller cover.

4. A paint roller cover stripper of claim 2, in which said hand-engaging member is rigidly affixed to said hollow stripping head by means of elongate members which are longer than the cover to be removed.

5. A paint roller cover stripper of claim 4, in which said elongate members are affixed to the base of said hollow stripping head.

6. A paint roller cover stripper for stripping off the paint-holding cover from the spindle of a paint roller which has a laterally-projecting handle, comprising a stripping head having a central opening having a diameter such that it can slip over said spindle but not over said cover, and a radial slot which is wide enough to pass a handle member which projects laterally from said spindle, and force-transmitting means affixed to said stripping head whereby application of force thereto causes said stripping head to move down said spindle to strip the cover therefrom; in which said force-transmitting means comprises a rigid means mounted to push said stripping head down said spindle and which further comprises a base member and hand operated means for applying pressure to said rigid means to cause it to move relative to said base member; in which said base mamber comprises holding means to hold said spindle against movement when said stripping head is moved relative to said base member; and in which said holding means comprises engaging means for engaging said laterally-projecting handle member.

* * * * *

UNITED STATES PATENT AND TRADEMARK OFFICE
CERTIFICATE OF CORRECTION

PATENT NO. : 4,584,752

DATED : April 29, 1986

INVENTOR(S) : Charles T. Fuentes

It is certified that error appears in the above-identified patent and that said Letters Patent is hereby corrected as shown below:

Title Page [56] References Cited, U.S. PATENT DOCUMENTS, last line;
"Klaster" should read -- Kloster --

Sheet 1 of the drawings, FIG. 3, at the very top of this figure;
"30" should be touching the top line, as shown in the partial figure below:

"

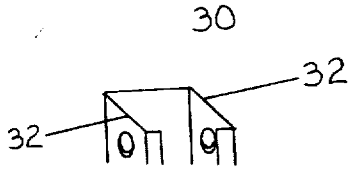

" should read --

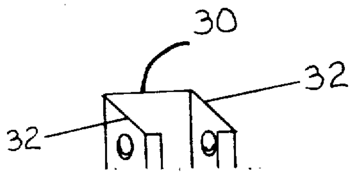

--

Col. 1, line 39; "as" (first occurrence) should read -- at --
Col. 1, line 50; after "affixed" insert -- adjacent --
Col. 2, line 21; "as" (first occurrence) should read -- at --
Col. 2, line 47; "received" should read -- receive --
Col. 6, line 3; "mamber" should read -- member --

Signed and Sealed this

*Twenty-ninth* Day of *July 1986*

[SEAL]

*Attest:*

DONALD J. QUIGG

*Attesting Officer* *Commissioner of Patents and Trademarks*